UNITED STATES PATENT OFFICE.

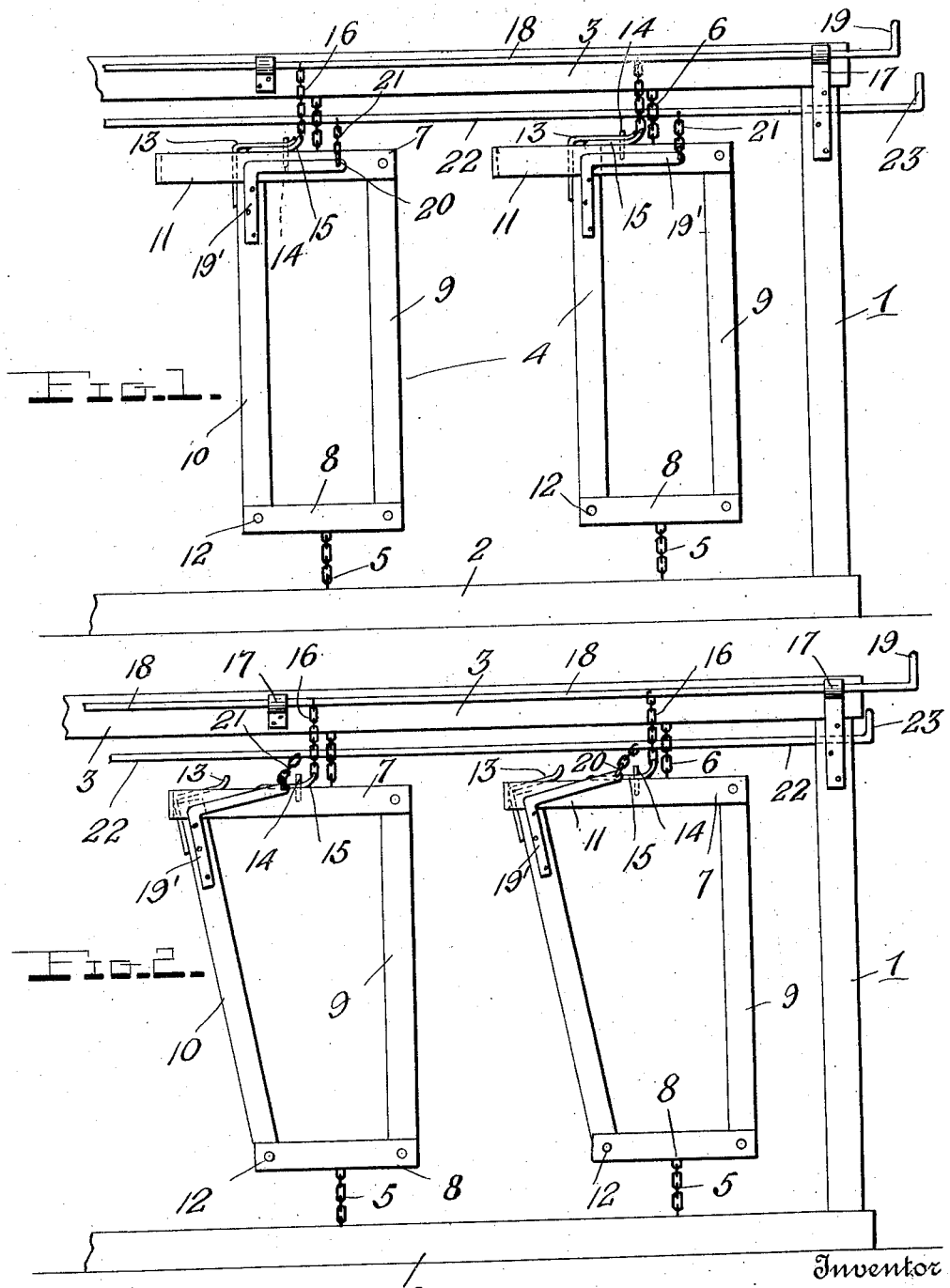

MARTIN H. DOOLEY, OF NORTH ADAMS, MASSACHUSETTS.

CATTLE-STANCHION.

972,069.  Specification of Letters Patent.  Patented Oct. 4, 1910.

Application filed June 7, 1909. Serial No. 500,619.

*To all whom it may concern:*

Be it known that I, MARTIN H. DOOLEY, a citizen of the United States, residing at North Adams, in the county of Berkshire and State of Massachusetts, have invented certain new and useful Improvements in Cattle-Stanchions; and I do declare the following to be a full, clear, and exact description of the invention, such as will enable others skilled in the art to which it appertains to make and use the same.

My invention relates to cattle stanchions. The object of the invention is the provision of a device of this character whereby one or more cattle may be released simultaneously or may be secured simultaneously. With this and other objects in view, the invention consists of certain novel features of construction, combination and arrangement of parts as will be more fully described and particularly pointed out in the appended claim.

In the drawings, Figure 1 shows a front elevation of the device with the stanchions locked in securing position; and Fig. 2 is a similar view showing the stanchions in released position.

Referring more especially to the drawings, 1 represents the uprights of a stanchion frame and 2, the bottom bar which is preferably secured to the floor of the stable. The uprights are connected as is usual, with a ceiling girder or other suitable support 3. These parts are of the usual construction and need no further description.

At suitably separated points, I secure to the members 2 and 3, stanchions 4, by means of the flexible connections 5 and 6. These frames comprise top and bottom bars 7 and 8, a side bar 9, and a locking bar 10.

The top bar of each stanchion is provided with a guiding extension 11, which is adapted to be engaged by the locking bar 10, which is pivoted at its lower end to the free extremity of the bottom bar 8, as shown at 12. Each locking bar is provided with a right-angular spring arm 13, having an aperture in its horizontal portion to engage the locking pin 14, carried by the top bar 7, so as to lock the bar 10 in closed position.

Secured to the top bar 7, and having its body portion normally lying flat thereon, is a spring 15, the outer free end of which is bent upwardly and is engaged by a flexible connection 16, which when operated to raise the spring 15, moves the member 13 out of engagement with the pin 14, and releases the locking bar 10.

Journaled in bearings 17, upon the supporting member 3, is a horizontal rod 18 having an operating handle 19 at one end thereof and having connection with the flexible members 16, so that upon reciprocation or rotation of the rod, the springs 15 may be raised to disengage the member 13 from the pin 14, as before described. This operation will release all of the stanchions simultaneously and free the locking bars as will now be described.

Connected to the upper end of each locking bar 10, is an L-shaped bar 19', which lies adjacent the bar 7, on the opposite side from the locking bar 10, and has connected to its free end by a snap hook 20, a chain or other suitable flexible connection 21. The chains 21 of each of the bars 19', are connected to a horizontal operating rod 22, having an operating handle 23, and journaled bearings carried by the uprights 1 parallel to the shaft 18.

By reciprocating the shaft within its bearings, the locking bars 10 may be either operated to free the cattle or lock them in the stanchion, it being understood that one or more of the snap hooks may be disengaged from the bars 19', so that certain of the cattle may be permitted to remain in the stable while the others are released.

It will be noticed from a close inspection of the figures that the shafts are offset from each other so that their movement does not affect one another.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim is:—

In a device of the class described, the combination with a support, of a plurality of stanchions flexibly secured thereto and each comprising a frame, a locking bar pivoted thereto, means for securing the locking bars of said stanchions in locked position, means for forcibly displacing said securing means, said displacing means throwing the locking bars to open position, a common operating bar, flexible connections from the operating bar to the displacing means, a reciprocating bar, and means connecting said bar with the locking bars of the stanchions, whereby they may be opened or closed.

In testimony whereof I have hereunto set my hand in presence of two subscribing witnesses.

MARTIN H. DOOLEY.

Witnesses:
NEIL FRIEL,
JAMES O. HEARN.